United States Patent
Garrity et al.

(10) Patent No.: US 11,042,718 B2
(45) Date of Patent: Jun. 22, 2021

(54) SMART CARD TRANSMITTER

(71) Applicant: Garrity Power Services LLC, Rockwall, TX (US)

(72) Inventors: Paul Garrity, Rockwall, TX (US); Jamie Len Dunn, Allen, TX (US)

(73) Assignee: Garrity Power Services LLC, Rockwall, TX (US)

( * ) Notice: Subject to any disclaimer, the term of this patent is extended or adjusted under 35 U.S.C. 154(b) by 0 days.

(21) Appl. No.: 16/580,665

(22) Filed: Sep. 24, 2019

(65) Prior Publication Data

US 2020/0097688 A1 Mar. 26, 2020

Related U.S. Application Data

(60) Provisional application No. 62/735,320, filed on Sep. 24, 2018.

(51) Int. Cl.
*G06K 7/08* (2006.01)
*G06K 7/10* (2006.01)
*G06K 19/077* (2006.01)

(52) U.S. Cl.
CPC ... *G06K 7/10297* (2013.01); *G06K 19/07709* (2013.01)

(58) Field of Classification Search
CPC ............ G06K 19/07709; G06K 7/10297
See application file for complete search history.

(56) References Cited

U.S. PATENT DOCUMENTS

| | | | |
|---|---|---|---|
| 2004/0192380 A1* | 9/2004 | Chen | H04N 1/2195 455/556.1 |
| 2005/0276570 A1* | 12/2005 | Reed, Jr. | G06F 16/637 386/231 |
| 2008/0119953 A1* | 5/2008 | Reed | G06F 16/64 700/94 |
| 2008/0120196 A1* | 5/2008 | Reed | G06Q 30/0278 705/17 |
| 2008/0140702 A1* | 6/2008 | Reed | G06F 16/40 |
| 2008/0141180 A1* | 6/2008 | Reed | G06F 16/40 715/854 |
| 2014/0266621 A1* | 9/2014 | Jones | G06K 7/10227 340/10.1 |
| 2016/0070629 A1* | 3/2016 | Basile | G06F 11/221 235/375 |
| 2016/0342381 A1* | 11/2016 | Song | G06K 7/10366 |

* cited by examiner

*Primary Examiner* — Thien M Le
(74) *Attorney, Agent, or Firm* — Hovey Williams LLP; Scott R. Brown

(57) ABSTRACT

An apparatus comprising a long-range transmitter having a unique identifier, a button, a card reader, a means for securing an identification card having a unique identifier and configured to be read by the card reader, and a controller coupled to the long-range transmitter, the button, and the card reader. The controller is configured to use the card reader to read the unique identifier of the identification card and to send a signal through the long-range transmitter when the button is pressed.

14 Claims, 6 Drawing Sheets

SMART CARD TRANSMITTER

RELATED APPLICATIONS

This patent application is a non-provisional utility application and claims priority benefit with regard to all common subject matter, of earlier-filed U.S. Provisional Patent Application Ser. No. 62/735,320, filed on Sep. 24, 2018, and titled "Smart Card Transmitter". The identified earlier-filed provisional patent application is hereby incorporated by reference in its entirety into the present application.

BACKGROUND

School and business campuses routinely issue identification (ID) cards to students and employees. These ID cards have embedded smart chips, RFID chips, or other components that typically contain encoded information, such as an identification number, that can be read by a card reader.

ID cards and corresponding card readers are often used for multiple functions such as providing access through doors, providing a method of funds transfer for campus services (e.g., a student meal plan), and providing identification for a lending system (e.g., equipment or library books). Written information and photos on ID cards may also be used for direct identification of ID card users. However, conventional ID cards and corresponding card readers cannot be used for emergency response purposes.

Meanwhile, school and business campuses provide emergency response buttons that can be tied into a system that provides location information to an emergency-response team. To that end, long-range low-power transceivers lend themselves to large scale deployment of low cost battery-operated devices that can be used in trilateration positioning systems without the need to replace the batteries for extended periods of time. For example, LoRa™ technology as described in U.S. Pat. No. 7,791,415, incorporated by reference in its entirety herein, uses a fractional-N phase-locked-loop to enable a modulated frequency that differs in up-frequency rate from down-frequency rate with great accuracy, thus allowing much longer range and lower power usage than standard transmission technology. However, conventional emergency response buttons cannot provide identification information.

SUMMARY OF THE INVENTION

These and other problems are generally solved or circumvented, and technical advantages are generally achieved, by advantageous embodiments of the present invention, including an apparatus comprising a long-range transmitter having a first unique identifier, a button, a card reader, a means for securing an ID card having a second unique identifier configured to be read by the card reader, and a controller coupled to the long-range transmitter, the button, and the card reader. The controller is configured to ascertain the second unique identifier via the card reader and to send a signal through the long-range transmitter when the button is pressed.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGS. generally refer to corresponding parts unless otherwise indicated, and may not be re-described in the interest of brevity after the first instance. The FIGS. are drawn to illustrate the relevant aspects of exemplary embodiments.

DETAILED DESCRIPTION OF ILLUSTRATIVE EMBODIMENTS

Figure 1:
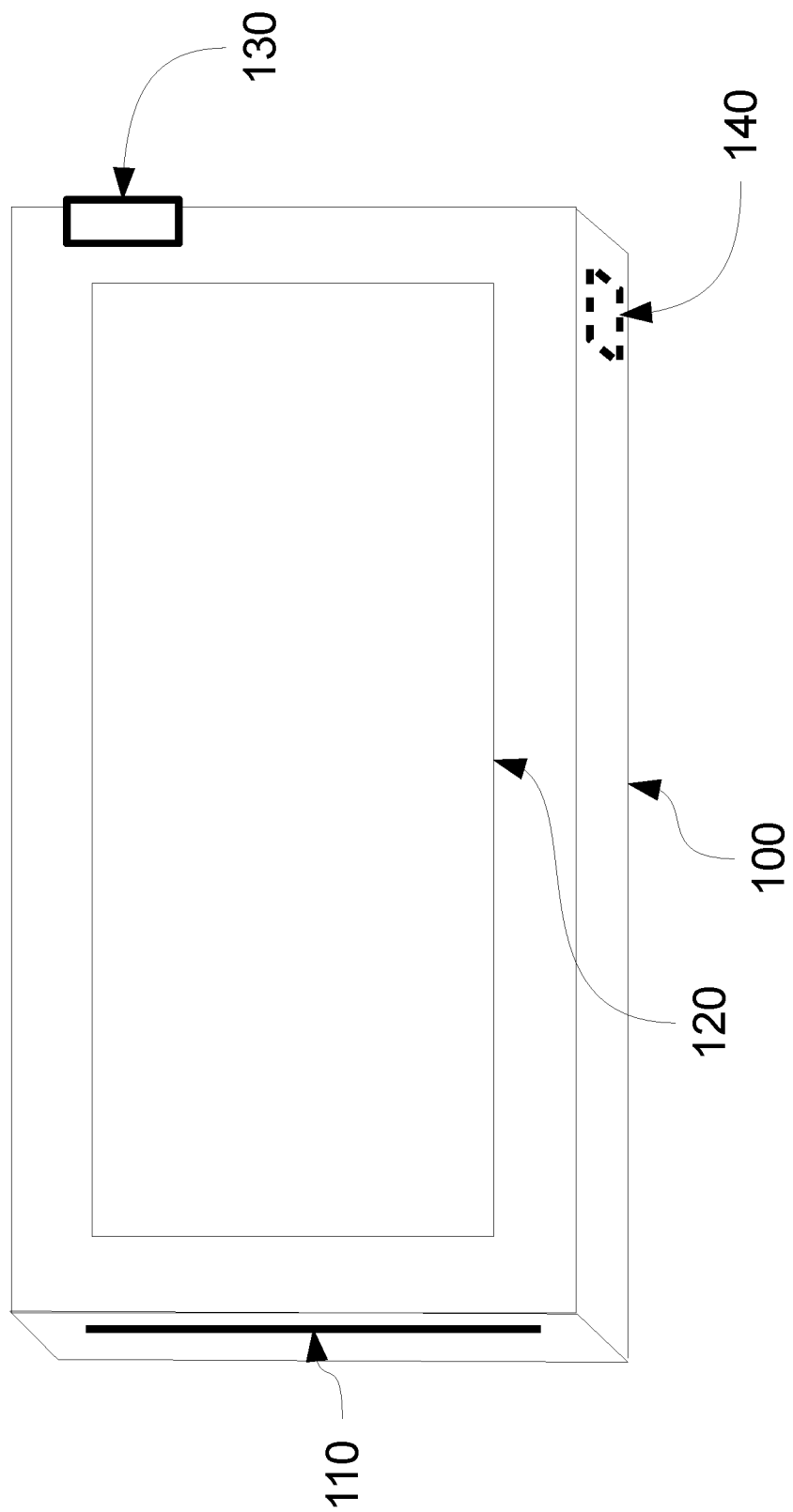
FIG. 1 is a top perspective view of a smart card transmitter apparatus constructed in accordance with an embodiment of the invention.

FIG. 1 illustrates an embodiment of a Smart Card Transmitter Apparatus 100. Slot 110 provides an opening for inserting a standard ID card into an enclosure of Smart Card Transmitter Apparatus 100. Window 120 exposes the majority of the front face of the ID card. Button 130 is a user interface that may be used to call or signal for help. Button 130 may also be used for pairing the Smart Card Transmitter Apparatus 100 to the ID card. User Feedback Device 140 provides feedback to the user and may comprise or may be a buzzer, an LED, or the like. User Feedback Device 140 may provide indication to the user of a condition or status of Smart Card Transmitter Apparatus 100, such as a low battery condition. User Feedback Device 140 may also provide indication to the user of an event such as, but not limited to, affirmation that Button 130 was pressed, affirmation that a signal from Smart Card Transmitter Apparatus 100 was received by a remote server, and affirmation that an emergency call center has seen or is responding to an alert that was transmitted from Smart Card Transmitter Apparatus 100.

Figure 2:
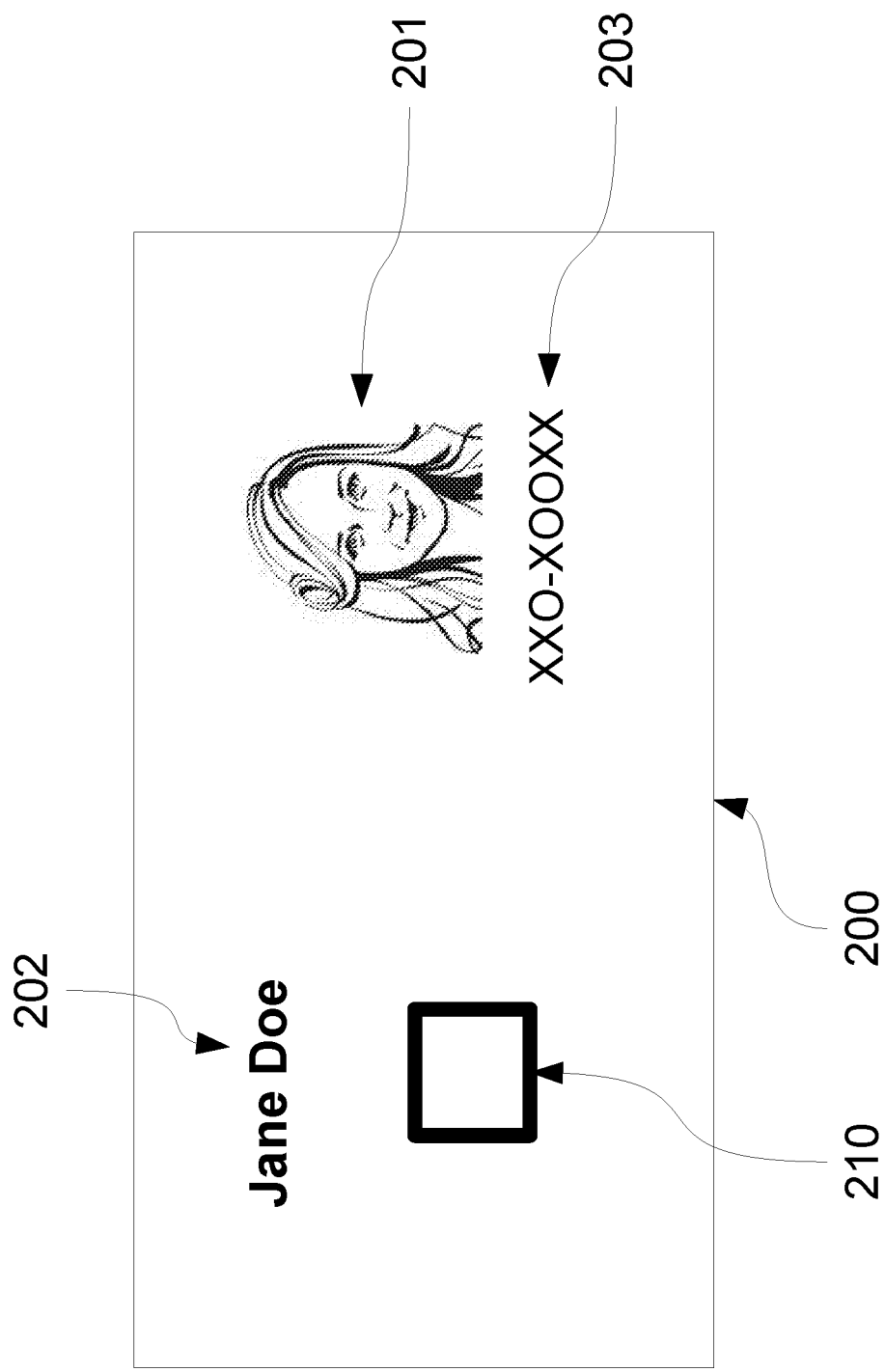
FIG. 2 is a top plan view of an ID card to be used with the smart card transmitter apparatus of FIG. 1.

FIG. 2 illustrates ID Card 200. ID Card 200 may be a standard type of RFID card that may for example be issued to students or staff on a college campus. RFID Module 210 is embedded into the card and includes a unique identifier associated with the ID Card 200. ID Card 200 includes identifying photograph 201 and Name 202 and may also include other identification information 203 of the card holder. The RFID Module 210 allows ID Card 200 to be used in applications requiring a card reader such as building access, borrowing applications (such as a library card) and cash transactions associated with a financial account of the card holder.

Figure 3:
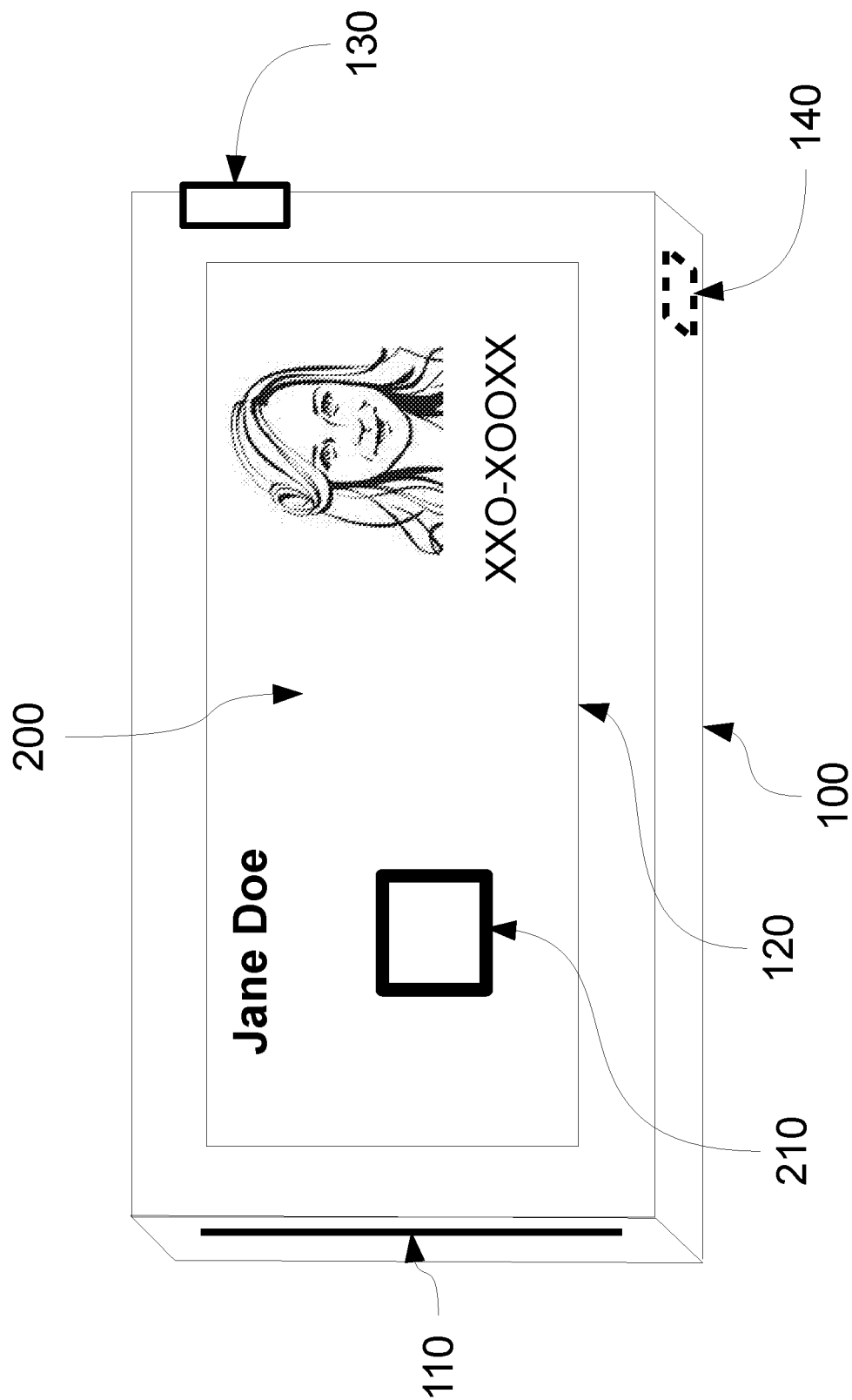
FIG. 3 is a top perspective view of the ID card of FIG. 2 inserted into the smart card transmitter apparatus of FIG. 1.

FIG. 3 illustrates an embodiment of Smart Card Transmitter Apparatus 100 in which ID Card 200 has been inserted into Slot 110. Following insertion, the front face of ID Card 200 is visible through Window 120. Furthermore, RFID Module 210 may still be read by external card readers, thus allowing ID Card 200 to be used in the same manner as when it was not inserted into Smart Card Transmitter Apparatus 100.

Smart Card Transmitter Apparatus 100 is configured so that when Button 130 is pressed, the unique identifier (and/or other associated information) of ID Card 200 is read, and that ID information is transmitted to remotely-located gateways and/or repeaters. Smart Card Transmitter Apparatus 100 may be configured to continue to transmit signals at regular intervals, such as 30 seconds or less, following a press of the button, for a predetermined period of time. Smart Card Transmitter Apparatus 100 may be configured to stop transmitting signals at regular intervals upon reception of a remotely supplied "stop" command. Smart Card Transmitter Apparatus 100 may also be configured to provide non-alert signals at regular intervals such as daily or weekly, to provide status information. The status information may comprise a signal indicative of remaining battery charge, battery life, or the like.

Figure 4:
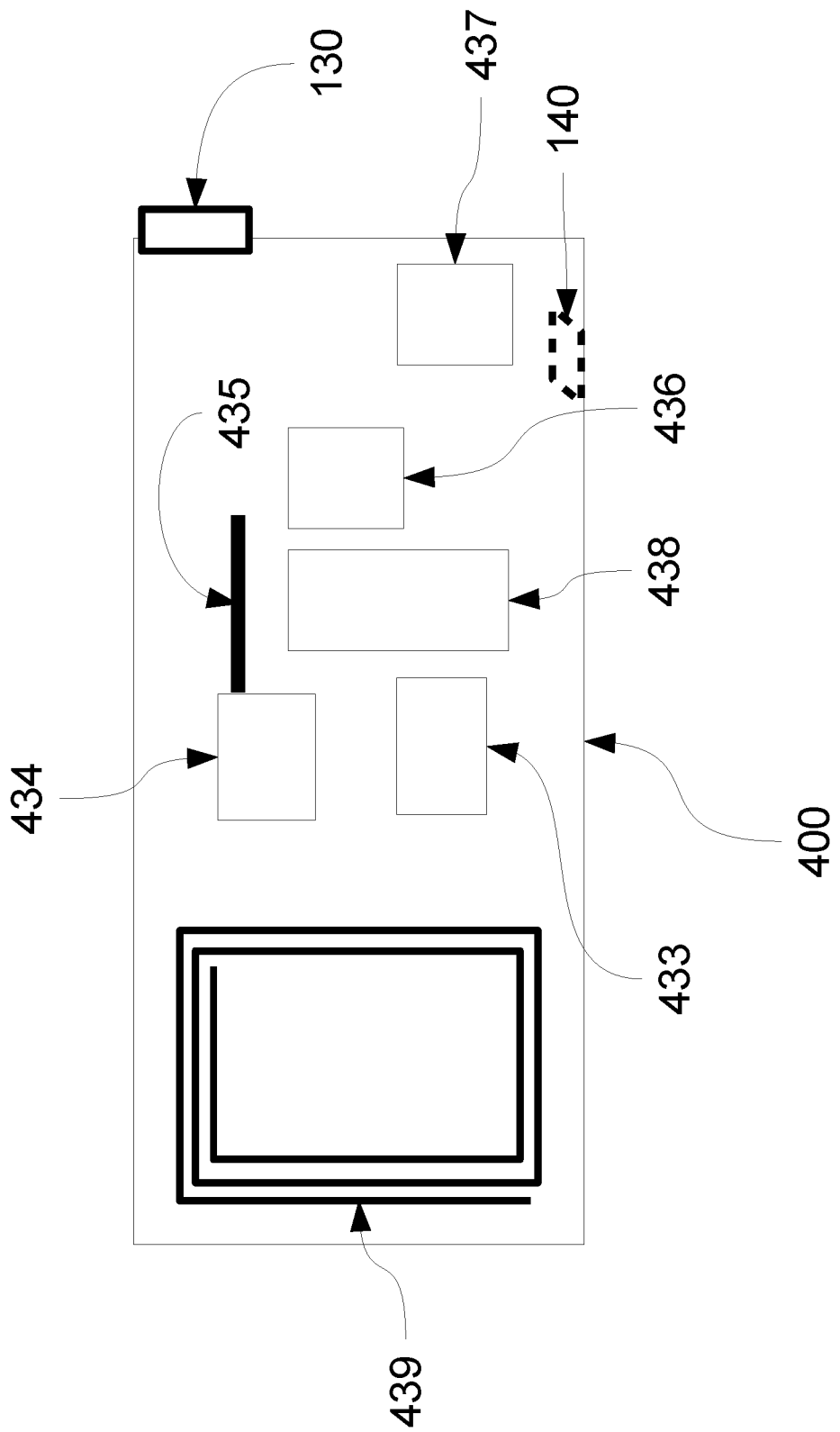
FIG. 4 is a top plan view of a circuit board of the smart card transmitter apparatus of FIG. 1.

FIG. 4 illustrates an embodiment of Circuit Board 400 that may be situated inside the enclosure of Smart Card Transmitter Apparatus 100. Button 130 which was illustrated in FIG. 1 is coupled to circuitry at the edge of Circuit Board 400. Battery 438 powers all circuitry on Circuit Board 400. Antenna 439 may be an RFID antenna and is coupled to RFID controller 433. Integrated Circuit 434 coupled to Antenna 435 implements LoRa technology, as described in U.S. Pat. No. 7,791,415, incorporated by reference in its entirety herein, which uses a fractional-N phase-locked-loop to enable a modulated frequency that differs in up-frequency rate from down-frequency rate with great accuracy, thus allowing long range transmission with very low power usage compared to standard transmission technology. Integrated Circuit 434 further comprises a unique identifier associated with the LoRa network.

Controller 436 is coupled to Button 130, User Feedback Device 140, Integrated Circuit 434, and RFID controller 433. Note that when ID Card 200 is inserted into Smart Card Transmitter Apparatus 100, RFID Module 210 is centered within the area of RFID antenna 439. When Button 130 is pressed, the Controller 436 causes RFID controller 433 to read the unique identifier of ID Card 200 that is embedded in RFID Module 210. Controller 433 then transmits the unique identifier of ID Card 200 along with the unique identifier of the LoRa Integrated Circuit 434 to LoRa Repeaters and Gateways that are in range. Note that the range for LoRa technology is typically on the order of 1 kilometer; however, the exact range will vary with transmission parameters as well as with obstructions in the transmission path. For example, a typical transmission range may vary from 200 m to 2.5 km. Controller 433 may also send a signal to User Feedback Device 140 (e.g. a buzzer or LED) to indicate to the user that the unique identifier of ID Card 200 along with the unique identifier of the LoRa Integrated Circuit 434 was successfully transmitted to LoRa Repeaters and Gateways that were in range.

Optional Bluetooth Low Energy (BLE) Module 437 is coupled to Controller 436. BLE Module 437 can be used to allow Controller 436 to communicate with a cell-phone application to determine status of Battery 438 and operational status of the Smart Card Transmitter Apparatus 100.

Figure 5:
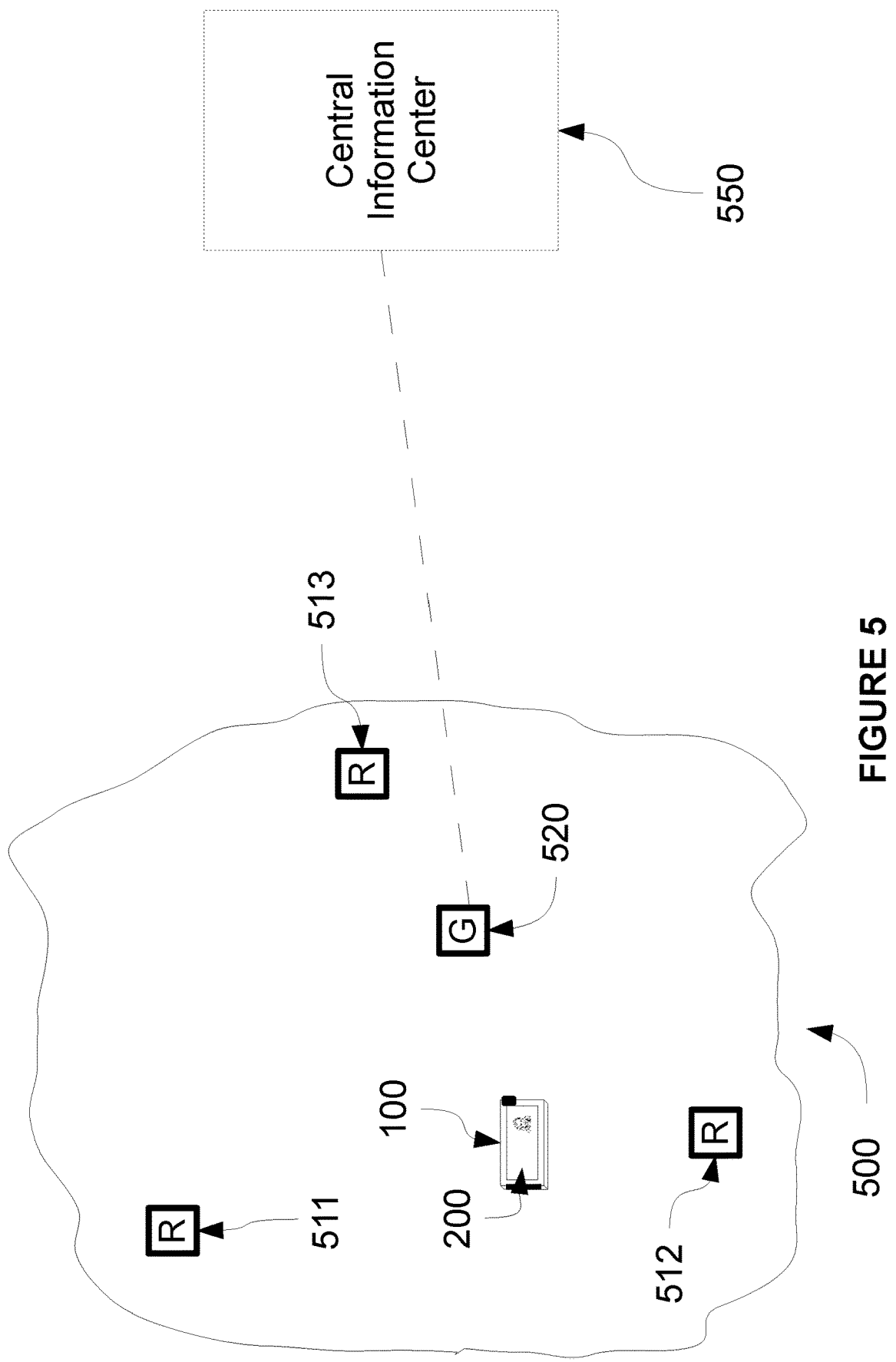
FIG. 5 is a plan view of an embodiment of a system employing a smart card transmitter apparatus.

FIG. 5 shows an example plan view of a campus that uses Smart Card Transmitter Apparatus 100. Campus 500 comprises Repeaters 511, 512, and 513 which are situated at various distinct points around the campus to enable location of a transmitter apparatus. Repeaters 511, 512, and 513 are configured to receive data transmissions from Smart Card Transmitter Apparatus 100 (with ID Card 200 inserted) and to forward the received data, along with the unique identifiers of each of the three repeaters and information identifying or representing signal strength of the originally-received data packet, to Gateway 520. Gateway 520 then forwards the data it receives to Central Information Center 550. Central Information Center 550 is able to use the signal strength information along with known locations of Repeaters 511, 512, and 513 to perform trilateration for locating Smart Card Transmitter Apparatus 100.

Many other configurations of repeaters and gateways could be used in the system setup shown in FIG. 5. For example, repeaters could be replaced with gateways. Additional repeaters or gateways could be used to obtain better resolution. Approximate location of Smart Card Transmitter Apparatus 100 could be determined by choosing the repeater or gateway with the highest signal strength rather than using trilateration.

In a typical system setup there will be many smart card transmitters with associated ID Cards located on the same campus and using the same set of repeaters and gateways for location determination and data packet forwarding to the information center.

Figure 6:
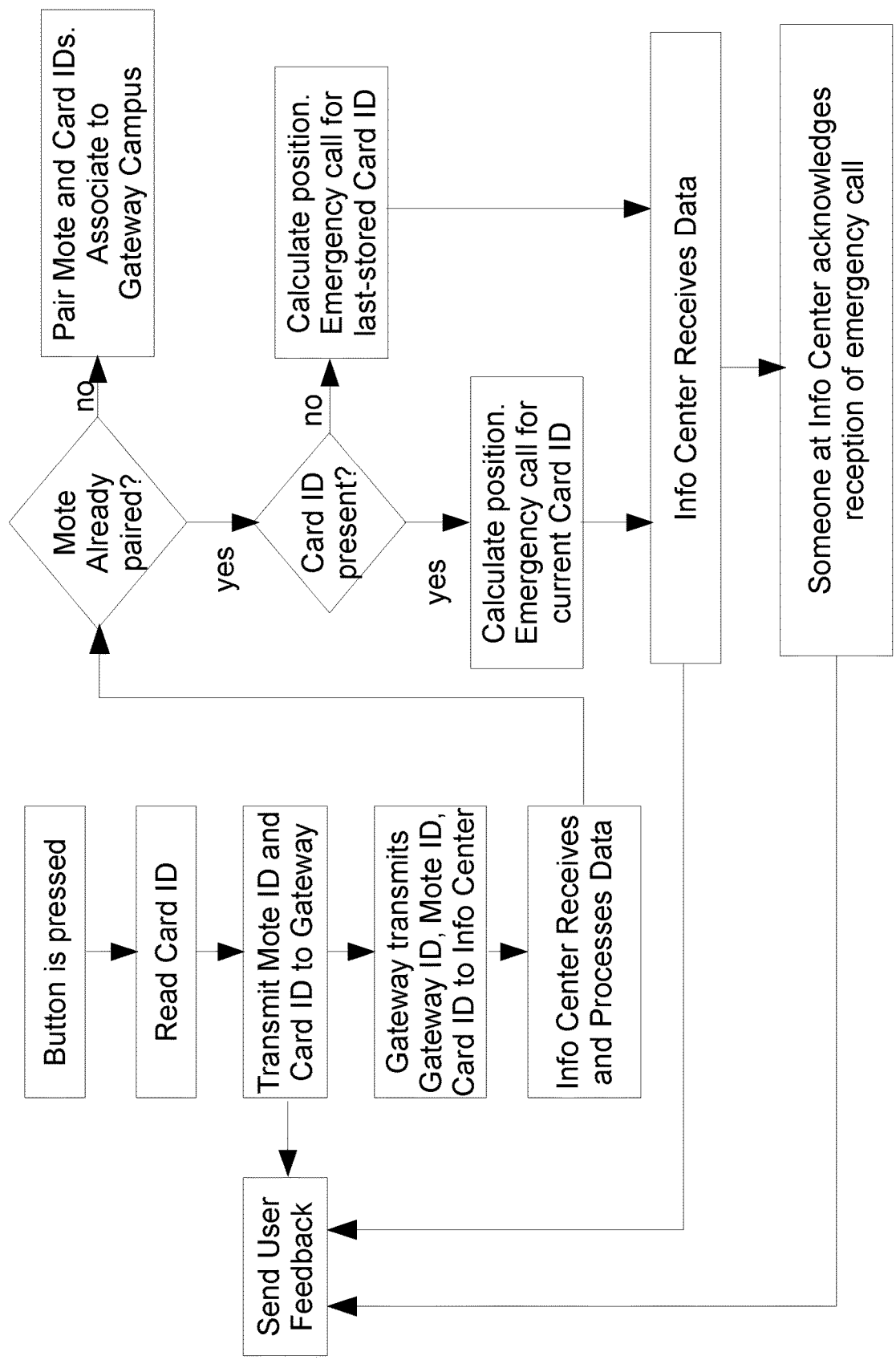
FIG. 6 is a flow diagram including steps for operating a smart card transmitter system according to an embodiment of the invention.

FIG. 6 shows an embodiment of a process for a system that uses Smart Card Transmitter Apparatus 100. The hardware in Smart Card Transmitter Apparatus 100 is capable of using all of the elements present in the setup of FIG. 5 to perform an initialization of the system whenever a new ID is added to Smart Card Transmitter Apparatus 100. When Button 130 is pressed, Controller 436 reads the unique identifier built into ID Card 200 using RFID Module 210. Controller 436 then transmits the unique identifier of ID Card 200 along with the unique identifier of the LoRa transmitter 434 (the Mote ID) to Gateway 520 via Repeaters 511, 512, and 513. Controller 436 also sends a signal to User Feedback Device 140 to let the user know that transmitter 434 has finished transmitting a signal. Gateway 520 forwards the information to Information Center 550.

Information Center 550 checks in a database to see whether or not the Mote ID has been paired to some ID Card. If not, then the button press is assumed to be a pairing operation, and the unique identifier of ID Card 200 is paired with the Mote ID (i.e. the unique identifier of Smart Card Transmitter Apparatus 100).

If it is determined that the Mote ID has already been paired with an ID Card, then Information Center 550 interprets the button press as an emergency call and checks for the presence of an ID Card within Smart Card Transmitter Apparatus 100 by checking the unique identifier of the ID Card that was transmitted with the data stream. If there is no card present, it is assumed that the previously-paired card is still associated with Smart Card Transmitter Apparatus 100, and an emergency call is directed accordingly. If there is a card present, then Information Center 550 updates the paired Mote ID and ID Card according to the new information that was transmitted and sends an emergency call according to the ID Card that is currently inserted into Smart Card Transmitter Apparatus 100. The Info Center then sends a signal back to Smart Card Transmitter Apparatus 100 to activate User Feedback Device 140 as an indication that the Info Center has successfully received the transmission.

When an emergency operator receives and acknowledges reception of an alert, the Info Center again sends a signal back to Smart Card Transmitter Apparatus 100 to activate User Feedback Device 140 as an indication that an emergency operator has received the transmission.

Smart Card Transmitter Apparatus 100, when used in conjunction with an array of Repeaters and Gateways along with an Information Center, is thus able to provide a system and method to locate a removable ID card placed into the Smart Card Transmitter Apparatus 100.

Other effective alternatives will occur to a person skilled in the art. For example, any form of storage of an ID card unique identifier and associated reader could just as easily be used instead of RFID such as magnetic stripe, biometric, smart chip, bar code, and near field communication (NFC). Also, while a button was shown as the user interface, any number of user interfaces could replace the button. Those skilled in the art will understand that the previously described embodiments of the smart card transmitter and related methods of operating the same are submitted for illustrative purposes only.

Also, although the present invention and its advantages have been described in detail, it will be understood that various changes, substitutions and alterations can be made herein without departing from the spirit and scope of the invention as defined by the appended claims. For example, many of the processes discussed above can be implemented in different methodologies and replaced by other processes, or combinations thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A smart card transmitter apparatus configured to receive a removable identification (ID) card having a unique identifier, the smart card transmitter apparatus comprising:
   a transmitter having a unique identifier;
   a user interface including a button, the user interface being configured to receive a stimulus;
   a card reader configured to read the unique identifier of the removable ID card; and
   a controller communicatively coupled to the transmitter, the user interface, and the card reader, said controller being configured to instruct the card reader to read the unique identifier of the removable ID card and being further configured to send a signal via the transmitter in response to the stimulus received by the user interface,
   the transmitter being configured to send data packets at regular intervals of at least 24 hours and being further configured to send data packets at intervals of less than 30 seconds upon the button being pressed.

2. The apparatus of claim 1, wherein the card reader is a radio-frequency identification (RFID) reader.

3. The apparatus of claim 1, wherein the card reader is a smart card reader.

4. The apparatus of claim 1, wherein the card reader is a near field communication (NFC) reader.

5. The apparatus of claim 1, further comprising a Bluetooth Low Energy (BLE) module configured to communicate with a cell phone.

6. The apparatus of claim 1, further comprising a user feedback mechanism configured to indicate to the user that the signal has been transmitted.

7. The apparatus of claim 1, in which the transmitter, the controller, and the card reader are configured to be powered from a common battery-powered supply.

8. A system comprising:
   a removable ID card having a unique identifier and comprising a means to facilitate reading of the unique identifier of the removable ID card;
   a gateway having a unique identifier and configured to receive data and to forward the received data to a centrally-located information center, the data including the unique identifier of the gateway;
   a smart card transmitter apparatus configured to be coupled to the removable ID card, said smart card transmitter apparatus including:
      a transmitter having a unique identifier;
      a card reader configured to read the unique identifier of the removable ID card; and
      a controller coupled to the transmitter, the button, and the card reader, said controller being configured to instruct the card reader to read the unique identifier of the removable ID card; and
      a button communicatively coupled to the controller, the controller being further configured to send a signal via the transmitter to the gateway when the button is pressed; and
   three repeaters configured to receive data and estimate signal strength from the transmitter,
   the gateway being configured to forward the signal strength information from the repeaters to the centrally-located information center, the centrally-located information center being configured to calculate a position of the smart card transmitter apparatus.

9. The system of claim 8, wherein the centrally-located information center is configured to associate the unique identifier of the removable ID card with the unique identifier of the gateway and the unique identifier of the transmitter.

10. The system of claim 8, wherein the centrally-located information center is configured to associate the unique identifier of the removable ID card with the unique identifier of the gateway and the unique identifier of the transmitter a first time the button is pressed and to equate subsequent button presses as an emergency situation.

11. The system of claim 8, wherein the transmitter is configured to send data packets at regular intervals of at least 24 hours and in which the transmitter is configured to send data packets at intervals of less than 15 seconds after the button is pressed.

12. The system of claim 8, wherein the transmitter, the controller, and the card reader are configured to be powered from a common battery-powered supply.

13. The system of claim 8, wherein the smart card transmitter apparatus further comprises a user feedback mechanism including at least one of a buzzer and a light-emitting diode such that the user feedback mechanism is configured to indicate to the user when the button is pressed and when the centrally-located information center receives the signal.

14. A system comprising:
a removable ID card having a unique identifier and comprising a means to facilitate reading of the unique identifier of the removable ID card;
a gateway having a unique identifier and configured to receive data and to forward the received data to a centrally-located information center, the data including the unique identifier of the gateway;
a smart card transmitter apparatus configured to be coupled to the removable ID card, said smart card transmitter apparatus including:
  a transmitter having a unique identifier;
  a card reader configured to read the unique identifier of the removable ID card; and
  a controller coupled to the transmitter, the button, and the card reader, said controller being configured to instruct the card reader to read the unique identifier of the removable ID card; and
a button communicatively coupled to the controller, the controller being further configured to send a signal via the transmitter to the gateway when the button is pressed,
the centrally-located information center being configured to associate the unique identifier of the removable ID card with the unique identifier of the gateway and the unique identifier of the transmitter a first time the button is pressed and to equate subsequent button presses as an emergency situation.

* * * * *